United States Patent [19]

Kwak

[11] Patent Number: 4,777,538

[45] Date of Patent: Oct. 11, 1988

[54] FOR STABILIZING VIDEO IMAGE DURING RECORDED PROGRAM CHANGES

[75] Inventor: Kuk Y. Kwak, Inchon, Rep. of Korea

[73] Assignee: Gold Star Co., Ltd., Seoul, Rep. of Korea

[21] Appl. No.: 815,063

[22] Filed: Dec. 31, 1985

[30] Foreign Application Priority Data

Dec. 31, 1984 [KR] Rep. of Korea .................... 14758

[51] Int. Cl.⁴ .................... H04N 5/76; G11B 7/00
[52] U.S. Cl. .................... 358/342; 358/907; 360/72.1; 360/78; 369/32
[58] Field of Search .............. 358/342, 907; 360/72.1, 360/72.2, 75, 78; 369/43, 32

[56] References Cited

U.S. PATENT DOCUMENTS 4,630,250 12/1986 Nonomura ............................ 369/32
4,646,278 2/1987 Okano .................................. 369/32

Primary Examiner—Robert L. Richardson
Attorney, Agent, or Firm—Birch, Stewart, Kolasch & Birch

[57] ABSTRACT

Image information recorded on a record medium such as a video disk is scanned in a search scan operation and the image information applied to the video screen is muted during time periods when the readout head of the device jumps between respective programs on the video disk. In addition, an image tracking device, which normally generates an image tracking difference signal, is inhibited during these jumping periods. The existence of a jumping operation is detected by the image tracking device, and the existence of an image difference signal above a predetermined reference level, indicates that the image tracking device has deviated from alignment with a recorded program. The inhibiting of the image difference signal and the muting of the image on the video screen are performed in synchronism with a vertical synchronizing signal of the video image display device. This sequence of operation ensures that a stable picture will exist on the video screen throughout the entire search scan operation including the periods wherein the readout transducer head is jumping from one program to another. That is, any noise that would normally result during the jumping periods will be blanked or muted and will not be visually perceivable on the video screen. Therefore, a person viewing the screen will not perceive any change in the image during the jump periods.

2 Claims, 4 Drawing Sheets

FOR STABILIZING VIDEO IMAGE DURING RECORDED PROGRAM CHANGES

FIELD OF THE INVENTION

This invention relates to an image reproducing instrument for reproducing image media of video disc etc., and more particularly an improved scan search device utilizing the vertical synchronization signal which can perform the function of scan search by synchronizing with the vertical synchronization signal that is the basic synchronization signal of screen, thereby obtaining a stable screen in the operation of a scan search.

BACKGROUND OF INVENTION

There is shown in FIG. 1 a scan search device of the prior art wherein, when the search operation command signal b was input to a scan search operation part 12, such a search operation part 12 was adapted to apply the pick-up driving signal c to a pick-up driver 14 to drive the pick-up, and at this time to apply the control signal d to the switching part 11 to turn it one, whereby to perform image tracking by the application of the image tracking, difference signal a via a switching part 11 to an image tracker or tracking device 13. In the meantime, said scan search operation part 12 detects from the image tracking difference signal a the time point at which the image tracking begins but this was difficult due to the driving of the pick-up, and broke or cut off the control signal d applied to a switching part 11 to turn it off, thereby jumping any order of program since the image tracking difference signal a was not applied to an image tracker 13, and thereafter applied the control signal d to a switching part 11 again to turn it on, thereby performing the image tracking.

However, in such an conventional device because the time point at which the switching part 11 interrupts the operation of it, is adapted to be determined when the image tracking difference signal a reaches the predetermined amplitude, irrespective of the vertical synchronization signal that is the basic synchronization signal of the screen, the switch part 11 interrupts the operation of it to appear in any portion of screen the portion that jumps said program, and therefore it could not obtain a stable screen in the operation of scan search.

OBJECT OF INVENTION

It is an object of the present invention, which is suggested for the purpose of removing drawbacks of the prior art as described above, to provide an improved scan search device which can obtain a stable screen in the operation of a scan search by synchronizing the function of a scan search with the vertical synchronization signal that is referred to as the basic synchronization signal.

SUMMARY OF INVENTION

This object of the present invention is accomplished by synchronizing the initiating point at which the program jumps with the time point at which the first vertical synchronization signal is input after the value of the image tracking difference signal reaches a predetermined amplitude; and then synchronizing the terminating point at which the program jumps with the time point at which the second vertical synchronization signal is input; and thereafter muting the image signal applied to the screen in the period when said program jumps.

BRIEF DESCRIPTION OF DRAWINGS

This and other objects and advantages of the present invention will become clear from the following description with reference to the accompanying drawings, wherein.

DETAILED DESCRIPTION OF INVENTION

Figure 1:
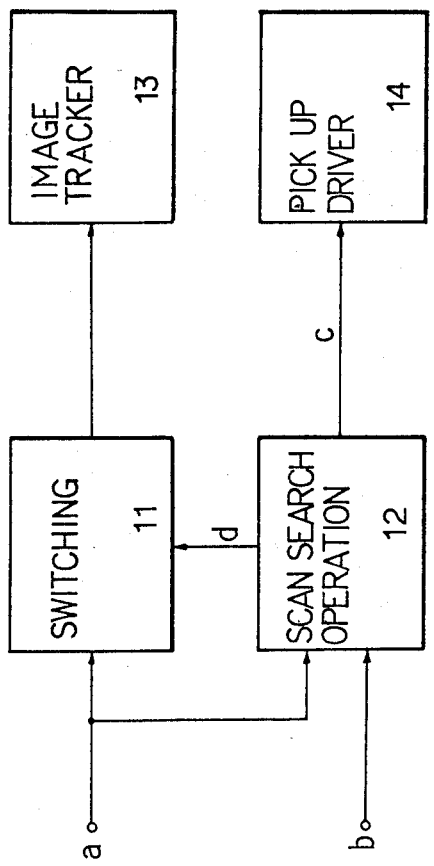
FIG. 1 is a block diagram of the conventional scan search device.
Figure 2:
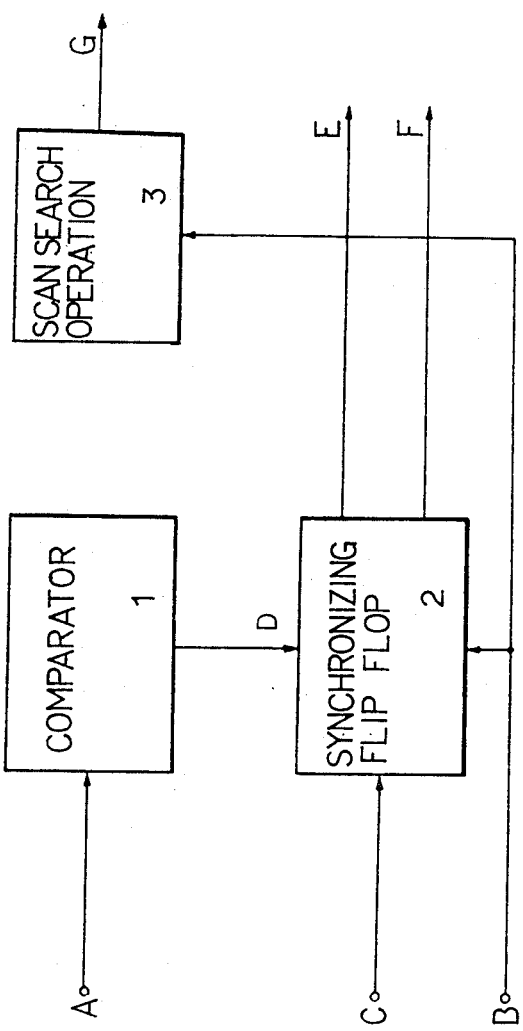
FIG. 2 is a block diagram of the scan search device in accordance with the present invention.

Referring first to FIG. 2, there is shown a block diagram of the scan search device of the present invention which includes a comparator 1 receiving the image tracking difference signal A and then outputting the comparison signal D; a synchronizing flip-flop 2 receiving the scan search operation command signal B, the vertical synchronization signal C and the comparison signal D of said comparator 1 and then generating the image tracking switch control signal E and the image muting signal F; and a scan search operation part 3 receiving said scan search operation command signal B and then generating the pick-up driving signal G.

Figure 3:
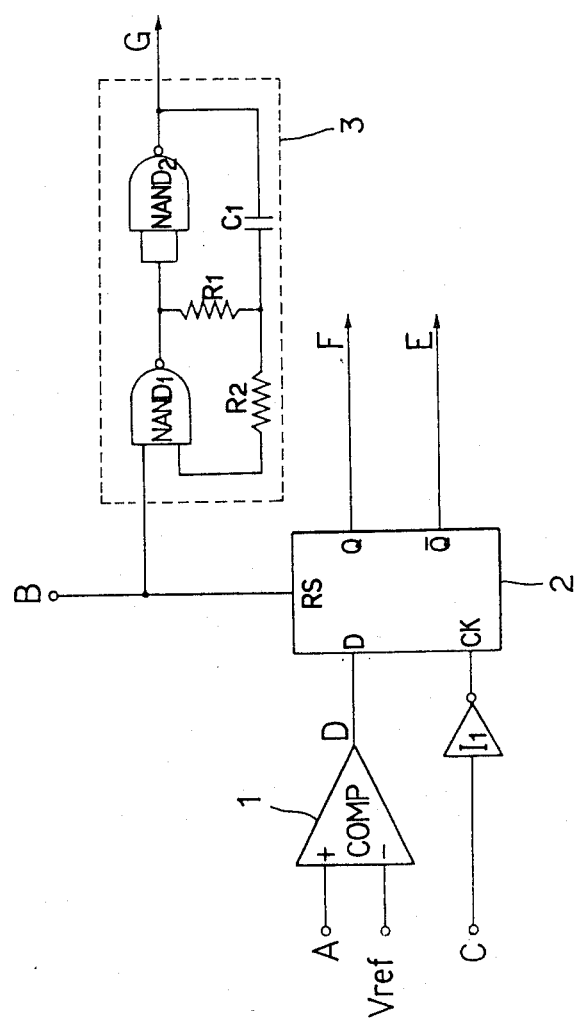
FIG. 3 is a detailed circuit diagram of the preferred embodiment of the invention as shown in FIG. 2.

Referring next to FIG. 3 which illustrates the detailed circuit diagram of a preferred embodiment of the invention, the comparator 1 has an inverting input terminal connected to apply the reference signal $V_{ref}$ and a non-inverting input terminal connected to apply the image tracking difference signal A; and the output terminal of said comparator 1 is connected to the input terminal D of synchronizing flip-flop 2; and the clock terminal CK of said synchronizing flip-flop 2 is connected to apply the vertical synchronization signal via an inverter $I_1$ and also the reset terminal $\overline{RS}$ of said synchronizing flip-flop 2 is connected to apply the scan search operation command signal B and thereafter one output terminal Q of it is applied as the image muting signal F while another output terminal $\overline{Q}$ of it is applied as the image tracking switch control signal E. Further, said scan search operation command signal B is applied to an input of the scan search operation part 3, which performs the oscillation operation, comprising NAND gates $NAND_1$ and $NAND_2$, resistors $R_1$ and $R_2$ and capacitor $C_1$, and the output terminal of said part 3 is applied as the pick-up driving signal G.

The operation and working effects of the present invention costructed as described above, will be explained in detail.

Figure 4:
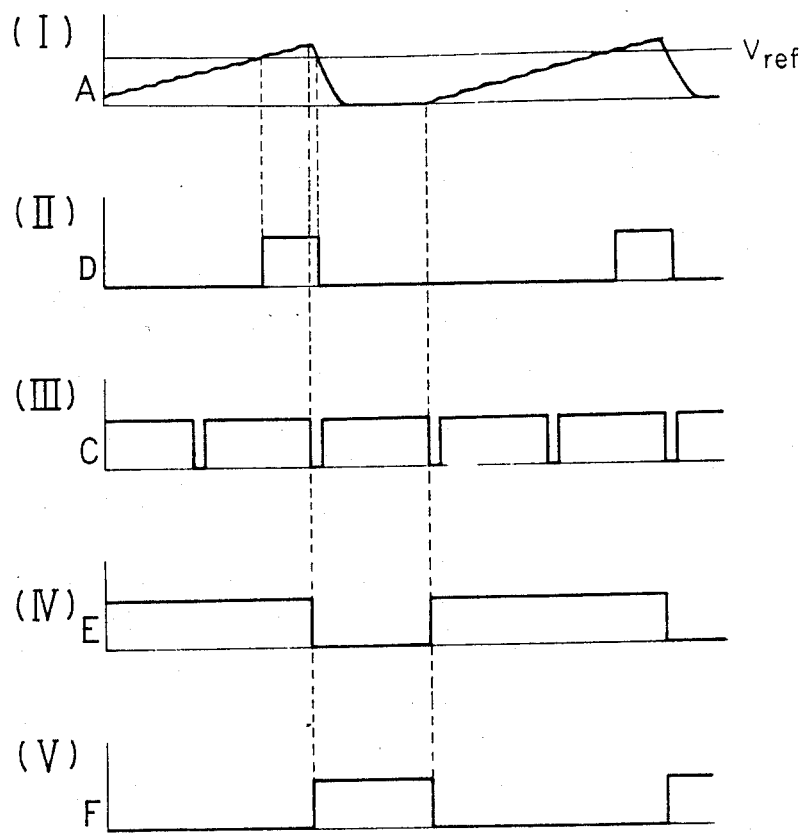
FIG. 4 illustrates the output waveforms of each portion in FIG. 3.

If the scan search operation command signal B is output as a high voltage level under the command of scan search operation, then the scan search operation command signal B of a high voltage level is applied to the reset terminal $\overline{RS}$ of synchronizing flip-flop 2 to release the flip-flop 2 in the reset state and also the scan search operation command signal B of a high voltage level is applied to a scan search operation part 3 to perform the oscillation operation and output the pick-up driving signal G whereby to drive the pick-up, so that the image tracking difference signal A applied to a non-inverting input terminal of comparator 1 is gradually increased as shown in FIG. 4(I). According to this, when the image tracking difference signal A becomes higher than the reference signal $V_{ref}$ the output signal D of comparator 1 is output as a high voltage level and applied to the input terminal D of synchronizing flip-flop (2) as shown in FIG. 4(II).

In this time, if the vertical synchronization signal C of a low voltage level is output as shown in FIG. 4(III), it is inverted to a high voltage level in an inverter $I_1$ and then applied to the clock terminal CK of synchronizing flip-flop 2, so that at the time point when the vertical synchronization signal C is applied as a high level signal, is output in one output terminal Q thereof as shown in FIG. 4(V) while a low level signal is output n another output terminal $\overline{Q}$ thereof as shown in FIG. 4(IV).

As described above, the high level signal output from one output terminal Q of synchronizing flip-flop 2 is applied as the image muting signal F, thereby muting the image signal which would appear on the screen; and the low level signal output in another output terminal $\overline{Q}$ of synchronizing flip-flop 2 is applied as the image tracking switch control signal E to break or cut off the application of the image tracking difference signal to an image tracker, whereby interrupting the image tracking and jumping said program.

Moreover, if the image tracking is interrupted as previously described, the image tracking difference signal A is decreased as shown in FIG. 4(I), so that the output signal D of comparator 1 is output to a low voltage level as shown in FIG. 4(II) and then applied to the input terminal D of synchronizing flip-flop 2. Therefore, at the time point when the next vertical synchronization signal is applied, a low level signal as shown in FIG. 4(IV) is output from one output terminal Q of synchronizing flip-flop 2 to release the image muting and a high level signal as shown in FIG. 4(IV) is output from another output terminal $\overline{Q}$ of synchronizing flip-flop 2 and applied as the image tracking switch control signal E, whereby applying the image tracking difference signal A to our image tracker to perform the image tracking again.

According to the present invention as described above, the initiating point and terminating point of the portion at which said program jumps is synchronized with the first input vertical synchronization signal after the image tracking difference signal becomes higher than the reference signal in the operation of a scan search and along the second input vertical synchronization signal; and the image appearing in screen during the portion in which said program jumps is muted, so that a stable screen without any damages of image can be reproduced in the operation of scan search.

While the invention has been particularly shown and described with reference to a preferred embodiment thereof, it will be understood by those skilled in the art that various changes and modifications may be made therein without departing from the true spirit and scope of the invention.

What is claimed is:

1. In a video image display apparatus for displaying images on a video screen, readout transducer means for reading out said images from a record medium having image information recorded thereon in a plurality of programs, means for generating a sequence of vertical synchronization signals for assisting in the conversion of said image information to said images on the video screen, and scan search means for successively scanning the image information in the respective programs while displaying the same on the video screen, said scan search means including drive means for jumping said readout transducer means from alignment with a given program on said record medium to another program thereon and means for generating a search command signal to initiate scanning of the respective programs, an improvement in the scan search means comprising:

(a) image tracking means associated with said readout transducer means for generating an image tracking difference signal with an amplitude below a predetermined reference level when said readout transducer means is aligned with a selected program on said record medium and with an amplitude above said reference level when said readout transducer means deviates from alignment with said selected program caused by jumping of said readout transducer means by said drive means;

(b) comparator means for comparing said image tracking difference signal with a signal representative of said reference level and generating a comparison signal indicative of whether said difference signal is above or below said reference level; and (c) synchronizing flip-flop means having,
  1. a first input for receiving said comparison signal,
  2. a second input for receiving said vertical synchronization signals, and
  3. a third input for receiving said search command signal, the coincidence of a comparison signal above said reference signal, a vertical synchronization signal and a scan command signal at said first, second and third input terminals causing said flip-flop means to output an image muting signal to mute any images applied to said video screen and a cut-off signal to said image tracking means to preclude generation of said image tracking difference signal, whereby a stable image on the video screen is maintained during operation of the search scan means even during the periods when the readout transducer means jumps between respective programs.

2. The apparatus of claim 1 wherein the next successive vertical synchronization signal applied to said second input of said flip-flop means enables said image tracking means to re-initiate the generation of said image tracking difference signal and removes said muting signal.

* * * * *